United States Patent [19]
Miyata et al.

[11] Patent Number: 5,848,949
[45] Date of Patent: Dec. 15, 1998

[54] INFINITELY VARIABLE SPEED TRANSMISSION

[75] Inventors: Hirofumi Miyata; Shinichiro Nishikawa, both of Kobe, Japan

[73] Assignee: Bando Chemical Industries, Ltd., Kobe, Japan

[21] Appl. No.: 862,917

[22] Filed: May 23, 1997

[30] Foreign Application Priority Data

May 28, 1996 [JP] Japan .................................. 8-133254

[51] Int. Cl.$^6$ .................................................. F16H 7/26
[52] U.S. Cl. ........................ 475/210; 475/211; 474/21; 474/29; 474/135
[58] Field of Search ..................... 474/101, 19, 21, 474/29, 30, 69, 72, 73, 75, 77, 37, 133, 134, 135; 475/207, 210, 211, 212, 213, 218

[56] References Cited

U.S. PATENT DOCUMENTS

| | | | |
|---|---|---|---|
| 2,164,818 | 7/1939 | Heyer et al. | 475/211 |
| 2,760,386 | 8/1956 | Southwick | 475/211 X |
| 3,850,050 | 11/1974 | Lemmens | 475/211 X |
| 4,589,303 | 5/1986 | Roberts | 475/211 |
| 4,644,820 | 2/1987 | Macy et al. | 475/211 |
| 4,969,856 | 11/1990 | Miyata et al. | 474/11 |
| 5,720,686 | 2/1998 | Yan et al. | 475/211 |

FOREIGN PATENT DOCUMENTS 62-118159  5/1987  Japan .

*Primary Examiner*—Richard M. Lorence
*Assistant Examiner*—Ankur Parekh
*Attorney, Agent, or Firm*—Sixbey, Friedman, Leedom & Ferguson, P.C.; Gerald J. Ferguson, Jr.

[57] ABSTRACT

In an infinitely variable speed transmission T of this invention, a belt variable speed mechanism 4 is arranged between a first rotatable shaft 1 and a second rotatable shaft 2. A planetary gear mechanism 81 is provided which comprises a first, a second, and a third element. The first element is drivingly coupled to the second rotatable shaft 2. The second and third elements are drivingly coupled by way of different power transmission lines to the first rotatable shaft 1. An enclosed gear housing space 78 is defined at the back of a fixed sheave 14 of a second variable speed pulley 13 of the belt variable speed mechanism 4, to house therein the planetary gear mechanism 81. A belt transmission mechanism 55 is arranged between the first and second rotatable shafts 1 and 2. Supported on a flange 82 integral with the second rotatable shaft 2 is a planetary gear 84 having a first gear part 85 that engages with a first sun gear 88 and a second gear part 86 that engages with a second sun gear 90. The first sun gear 88 is drivingly coupled to a second transmission pulley 57 of the mechanism 55. The second sun gear 90 is drivingly coupled to the second variable speed pulley 13 of the mechanism 4. The distance between the shafts 1 and 2 can be changed easily, and the size of casing for gear engagement area covering can be made as small as possible.

9 Claims, 2 Drawing Sheets

INFINITELY VARIABLE SPEED TRANSMISSION

BACKGROUND OF THE INVENTION

1. Field of the Invention

The present invention generally relates to infinitely variable speed transmissions, and more particularly to an infinitely variable speed transmission by a combination of a belt variable speed mechanism and a planetary gear mechanism.

2. Description of the Prior Art

Various belt-type infinitely variable speed transmissions have been well known in the art. A typical belt-type infinitely variable speed transmission is now illustrated. A pair of rotatable shafts are arranged in parallel to each other. Each of the rotatable shafts is provided with a fixed sheave and a movable sheave and these sheaves together form a variable speed pulley. The fixed sheave is secured to the rotatable shaft. The fixed sheave is not slidable but rotatable with the rotatable shaft. The movable sheave is mounted on the rotatable shaft in such a way as to face the fixed sheave, and a V-shaped belt groove is defined between the movable sheave and the fixed sheave. More specifically, the movable sheave, supported on the rotatable shaft, is not only rotatable with the rotatable shaft but also slidable. The belt variable speed mechanism includes a V-belt that passes about the variable speed pulleys along the V-shaped belt grooves. In such an infinitely variable speed transmission, an effective radius for the V belt is made variable by the axial movement of the movable sheave, to change a transmission ratio between the rotatable shafts.

Japanese Pat. Appln. Laying Open Gazette No. 62-118159 shows an infinitely variable speed transmission. This transmission includes a planetary gear mechanism (a differential gear mechanism) as a gear mechanism for transmission, in addition to the above-described belt variable speed mechanism.

In the transmission shown in the above-described prior art, when trying to rotate an output-side rotatable shaft in the stopped state by making use of the planetary gear mechanism, a power transmission line becomes divided into a drive power line and a circulation power line. In other words, in a differential gear system of a closed-line type, one of three elements of the planetary gear mechanism is coupled to the output-side rotatable shaft and the rotational speed of another element of the planetary gear mechanism is changed by adjusting the pulley ratio of the belt variable speed mechanism, to have the element and the remaining element differ from each other both in rotational direction and in rotational speed, whereby the direction in which the output-side element (i.e., the output-side rotatable shaft) and the speed at which the output-side element rotates are determined. At this point in time, both drive power and circulation power are produced. Output power is calculated by subtracting the circulation power from the drive power. The rotation speed of the elements in the planetary gear mechanism determines which of the two power transmission lines extending from the input-side rotatable shaft to the output-side rotatable shaft becomes a drive power line or a circulation power line. More specifically, an element with the fastest rotation speed serves as a drive power line. The element rotation speed, used here, is an element peripheral speed on pitch circle.

In an infinitely variable speed transmission using a combination of a belt variable speed mechanism and a planetary gear mechanism, the belt variable speed mechanism as one power transmission line and a transmission gear mechanism as the other power transmission line through which to transmit power to the planetary gear mechanism, are placed in parallel between two rotatable shafts. This produces the problem that, when trying to make a change in the distance between the two rotatable shafts, it is necessary to carry out complicated design of making changes in the size of gear and the number of gears in the transmission gear mechanism, which is time consuming.

Additionally, a lubricant is applied between elements of the planetary gear mechanism and to gear engagement areas of the transmission gear mechanism for transmitting power to the elements. Such lubrication requires a bulky enclosed lubricant holding case to entirely enclose the planetary gear mechanism and the transmission gear mechanism for providing liquid-tight sealing. The provision of such a case results in an increase in cost.

Accordingly, an object of the present invention is to make it possible to easily change a shaft-to-shaft distance and to make the size of casing to cover gear engagement area as compact as possible for a reduction in cost.

SUMMARY OF THE INVENTION

Bearing in mind the above-described problems with the prior art techniques, the present invention was made. To achieve the foregoing object of this invention, a fixed sheave of a variable speed pulley in a belt variable speed mechanism is utilized. More specifically, an enclosed gear housing space is defined at the back of the fixed sheave, to house therein a planetary gear mechanism. Additionally, means, which is a power transmission line other than a power transmission line by a belt variable speed mechanism for transmission of power to the planetary gear mechanism, is formed by a transmission belt.

The present invention provides an infinitely variable speed transmission which comprises:

(a) a first and second rotatable shafts which are arranged to be parallel to each other;

(b) a belt transmission mechanism including:
   a first transmission pulley which is rigidly secured to said first rotatable shaft to rotate therewith;
   a second transmission pulley which is supported on said second rotatable shaft;
   a transmission belt which passes about said first and second transmission pulleys;
   a transmission belt tension mechanism which presses a loose-side span of said transmission belt to exert upon said transmission belt a tension;

(c) a belt variable speed mechanism including:
   (i) a first variable speed pulley which has a fixed sheave and a movable sheave;
      said fixed sheave being rigidly secured to said first rotatable shaft to rotate therewith;
      said movable sheave being supported on said first rotatable shaft to be axially movable;
   (ii) a second variable speed pulley which has a fixed sheave and a movable sheave;
      said fixed sheave being rotatably secured onto said second rotatable shaft;
      said movable sheave being supported on said second rotatable shaft to be axially movable;
   (iii) a variable speed belt which passes about said first and second variable speed pulleys;
   (iv) a pair of drive mechanisms which move said movable sheaves nearer to or away from said fixed sheaves located opposite to said movable sheaves to make a change in the belt winding diameter of said first and second variable speed pulleys;

(v) a linkage mechanism which interlocks said pair of drive mechanisms with each other in order that the belt winding diameter of said first variable speed pulley and the belt winding diameter of said second variable speed pulley vary in opposite directions, to make a change in the pulley ratio between said first and second variable speed pulleys;

(vi) a variable speed belt tension mechanism which presses a loose-side span of said variable speed belt to exert upon said variable speed belt a tension;

wherein an enclosed gear housing space is defined at the back of said fixed sheave of said second variable speed pulley, and wherein said gear housing space is covered with a gear casing formed by said fixed sheave of said second variable speed pulley and a cover part extending from the outer periphery of said fixed sheave of said second variable speed pulley to the outer peripheral of said second rotatable shaft; and (d) a planetary gear mechanism;

said planetary gear mechanism being housed in said gear housing space and mounted on said second rotatable shaft;

said planetary gear mechanism having a first, a second, and a third element;

said first element being drivingly coupled to said second rotatable shaft;

said second element being drivingly coupled to said second transmission pulley on said second rotatable shaft;

said third element being drivingly coupled to said second variable speed pulley on said second rotatable shaft;

wherein by virtue of said change in the pulley ratio between said first and second variable speed pulleys made by said linkage mechanism, the action of switching among (A) a forward state in which one of said first and second rotatable shafts rotates in one direction in relation to the other of said first and second rotatable shafts, (B) a neutral state in which one of said first and second rotatable shafts stops rotating, and (C) a backward state in which one of said first and second rotatable shafts rotates in an opposite direction to said one direction in relation to the other of said first and second rotatable shafts, is carried out for the varying of speed; and wherein in said belt variable speed mechanism said variable speed belt exerts respective pressing forces to press said movable sheaves of said first and second variable speed pulleys in the axial directions of said first and second rotatable shafts through said linkage mechanism and said drive mechanisms, and restoration to said neutral state is performed by a difference between said pressing forces.

In accordance with the above-described structure, one power transmission line including the belt variable speed mechanism and the other transmission line including the belt transmission mechanism are arranged in parallel to each other between the first rotatable shaft and the second rotatable shaft. As a result of such arrangement, power, fed to the first rotatable shaft or to the second rotatable shaft, whichever acts as an input section, is transmitted, wherein one of the belt variable speed mechanism and the belt transmission mechanism severs as a drive power transmission line and the other mechanism serves as a circulation power transmission line, and thereafter the power is provided in which either the first rotatable shaft or the second rotatable shaft acts as an output section. Subsequently, the linkage mechanism works to make a change in the pulley ratio of the belt variable speed mechanism and, as a result, the output section is switched among forward state, neutral state, and backward state in relation to the input section for the varying of speed.

In the belt variable speed mechanism, one of the drive mechanisms is made operative by virtue of the operation of the linkage mechanism, to axially move the movable sheave of one of the variable speed pulleys. With this movement, the other drive mechanism is also made operative. As a result, the movable sheave of the other variable speed pulley moves in an opposite manner to the movement of the movable sheave to the fixed sheave of the one of the variable speed pulleys (that is, the movable sheave moves nearer to or away from the fixed sheave). These two movable sheaves move in opposite directions, to make a change in the pulley ratio between the variable speed pulleys.

Each drive mechanism is operable to move the movable sheave nearer to or away from its corresponding fixed sheave from the back thereof. The drive mechanisms are linked together by virtue of the linkage mechanism. As a result of such arrangement, a pressing force exerted by the variable speed belt upon one of the variable speed pulleys is canceled by another exerted by the variable speed belt upon the other variable speed pulley. Accordingly, when the transmission is in the neutral state, the variable speed pulleys in the belt variable speed mechanism each become a drive-side pulley (or a driven-side pulley). The distribution of tension exerted by the variable speed belt upon the variable speed pulleys is in balance, and pressing forces exerted by the variable speed pulleys upon the movable sheaves become identical with each other. Therefore, the difference in belt pressing force between the variable speed pulleys becomes zero, whereby the neutral state is maintained.

However, if the transmission makes a transition in state from neutral to forward or to backward, this then results in having the belt winding diameter of one of the variable speed pulleys become greater than that of the other variable speed pulley. The distribution of tension exerted by the variable speed belt upon the variable speed pulleys is then in imbalance and variable speed belt effective tension, i.e., a difference between a tension-side tension and a loose-side tension, is produced. The variable speed pulley that has undergone an increase in the belt winding diameter becomes a drive-side variable speed pulley. On the other hand, the variable speed pulley that has undergone a decrease in the belt winding diameter becomes a driven-side variable speed pulley. Pressing force exerted by the variable speed belt upon the drive-side variable speed pulley becomes greater than pressing force exerted upon the driven-side variable speed pulley. As the load increases, the difference in belt pressing force between the drive- and driven-side pulleys increases. In other words, if the transmission slightly changes from its neutral state thereby causing the pulley ratio of the belt variable speed mechanism to change, this produces a difference in belt pressing force between the variable speed pulleys in spite of the fact that there is a belt pressing force cancellation between the variable speed pulleys. Due to such a difference, the drive-side pulley with an increased belt winding diameter decreases in belt winding diameter, and a restoring force is exerted so that the transmission is automatically brought back to the neutral state. By virtue of this restoring force, the transmission enters the neutral state in which the output-side rotatable shaft is in the stopped state, and the foregoing belt pressing force distribution between the pulleys comes to be in balance. As a result, variable speed belt effective force disappears, whereby the neutral state is maintained. This allows the transmission to stably keep its neutral state.

The planetary gear mechanism is mounted on the second rotatable shaft. The power transmission line including the belt variable speed mechanism and the power transmission line including the belt transmission mechanism are placed in parallel between the first and second rotatable shafts. Both the variable speed belt of the belt variable speed mechanism and the transmission belt of the belt transmission mechanism pass about the first and second rotatable shafts. By virtue of such arrangement, making a change in the shaft-to-shaft distance between the first and second rotatable shafts can be done by simply replacing the transmission and variable speed belts with ones having a different length. Unlike cases in which a drive force transmission line is formed using a transmission gear mechanism, changes in design can be made easily.

In addition to the above, it is arranged such that both of the transmission belt of the belt transmission mechanism and the variable speed belt of the belt variable speed mechanism pass around the first and second rotatable shafts. This makes it possible to assembly the transmission by simply passing the transmission and variable speed belts about the first and second rotatable shafts. Accordingly, the transmission of the present invention may be dealt with in the same manner as dealing with commonly-used belt-type transmissions in which a V belt is passed about pulleys.

In addition, the transmission belt and the variable speed belt may be used uncovered. Accordingly, there is no need to cover the belts with a casing. Only the planetary gear mechanism requires to be covered with a case. Defined at the back of the fixed sheave of the second variable speed pulley on the second rotatable shaft in the belt variable mechanism is an enclosed gear housing space that is covered with a gear case including the fixed sheave. The planetary gear mechanism is, sealably from the outside and liquid-tightly, housed in the gear housing space. The gear case of the planetary gear mechanism makes use of the fixed sheave of the second variable speed pulley, thereby making itself compact in size. This contributes to a reduction of the cost of the transmission.

It is preferred in the above-described infinitely variable speed transmission that:

(a) the orientation of said movable sheave to said fixed sheave of said first variable speed pulley is in opposite relation to the orientation of said movable sheave to said fixed sheave of said second variable speed pulley, in said belt variable speed mechanism;

(b) each said drive mechanism is a cam mechanism;

(c) said cam mechanism includes a tubular rotatable cam which is rotatably supported on a boss portion of said movable sheave of said variable speed pulley through a bearing member, and a fixed cam which is in cam contact with said rotatable cam;

(d) a cam surface is formed at one of said rotatable cam and said fixed cam while the other of said rotatable cam and said fixed cam acts as a cam follower in contact with said cam surface, and said movable sheave is axially moved by relative rotation of said rotatable cam and said fixed cam; and (e) said linkage mechanism is provided with a link for coupling together said rotatable cams of said cam mechanisms.

The rotatable cams of the cam mechanisms of the variable speed pulleys are coupled together by the linkage mechanism having a single link, which allows the rotatable cams to interlock with each other. When making a change in the ratio of the number of revolutions of the output section to the number of revolutions of the input section (i.e., the transmission ratio of the transmission), the rotatable cam of the cam mechanism of one of the variable speed pulleys is made to turn around the rotatable shaft. The movable sheave of the one of the variable speed pulleys is moved axially by virtue of cam contact between the rotatable cam and the fixed cam. With this movement, the movable sheave of the other of the variable speed pulleys moves in opposite fashion to the movement of the movable sheave to the fixed sheave of the one of the variable speed pulleys (that is, the movable sheave moves nearer to or away from the fixed sheave). These two movable sheaves move in opposite directions, to make a change in the pulley ratio of the belt variable speed mechanism.

For example, suppose that the rotatable cams of the cam mechanisms each have a cam surface which tilts at a predetermined angle in relation to a surface orthogonal to the rotatable shaft and that the fixed cam is provided with a cam follower that moves on the cam surface. In such a case, force is applied from the cam follower on the fixed cam to the cam surface of the rotatable cam in a direction perpendicular to the cam surface. This force is divided into a parallel component in a direction parallel to the rotatable shaft and a normal (right-angle) component in a direction orthogonal to the rotatable shaft. The latter component exerts at right angles to a line connecting together the center of the rotatable shaft and a coupling point to the link of the linkage mechanism. With this exertion, a cam rotational reaction force, which is at right angles to the connecting line and in an opposite direction to the normal component, is produced, regardless of a change in the pulley ratio. This cam rotational reaction force exerts on a boss portion of the movable sheave on which the rotatable cam is supported such that the boss portion is pressed at the central position of a range of the pulley about which the variable speed belt is wound. In other words, the cam rotational reaction force applied against the boss portion works at a clearance in a slide area of the boss portion and the rotatable shaft in such a manner that a moment, which is opposite to a moment that works to cause the movable sheave to incline towards the rotatable shaft when the variable speed belt applies a pressing force to the movable sheave, results. The original moment is canceled by the resulting moment to diminish. The distribution of surface pressure of the inner periphery of the boss portion of the movable sheave with respect to the outer periphery of the rotatable shaft, is dispersed in the direction of the shaft center, and the resistance of sliding of the boss portion is reduced without a great peak. By an amount proportional to such a decrease in the sliding resistance, the load of belt pressing force applied by the rotatable cam to a fixed point (i.e., the taken-out pressing force) increases. In other words, belt generation pressing force is transmitted as a taken-out pressing force to the rotatable cam without great resistance.

In the belt variable speed mechanism, the variable speed pulleys are arranged in opposite relationship in closing/opening force and the rotatable cams of the cam mechanisms are coupled together by the link in order that the closing/opening forces of the variable speed pulleys are partially canceled. It is designed such that the taken-out pressing force of one of the cam mechanisms is used in the belt pressing force of the other of the cam mechanism. For example, if such a relationship is compared to a seesaw, a taken-out pressing force at the drive side and another at the driven side are the same although the foregoing taken-out pressing force itself is greater in the present invention than in the prior art technique when the pulley ratio is constant and when no transmission switching is carried out. By virtue of such a balance, pressing force can be taken out at the same efficiency as the prior art technique. However, when making a change in the pulley ratio, the difference between belt generation pressing force and taken-out pressure is a necessary load (an operation force) for transmission operation. In prior art technology, as the taken-out pressing force decreases the remaining control operation force increases by a proportional amount. Conversely, in the present invention, since the taken-out pressing force is great, this provides a corresponding reduction in the operation force. This provides the advantage that resistance, occurring when the transmission enters the neutral state, is reduced by a belt pressing force balance established between the variable speed pulleys in the belt variable speed mechanism, thereby achieving smooth adjustment to the neutral state.

It is preferred in the above-described infinitely variable speed transmission that said transmission belt tension mechanism of said belt transmission mechanism is constructed in such a way as to stop pressing said transmission belt for cutting off power transmission by said transmission belt between said first and second transmission pulleys.

When the transmission belt tension mechanism of the belt transmission mechanism stops pressing the transmission belt, transfer of power between the first and second transmission pulleys is cut off and, as a result, no power is transmitted between the first and second rotatable shafts. This enables the transmission belt tension mechanism to function as an emergency clutch. Since the transmission belt has a narrow range of movement in comparison with the variable speed belt, this provides stable clutch effects.

It may be arranged in the above-described infinitely variable speed transmission such that:
(a) said first element of said planetary gear mechanism is formed of a supporting member;
   said supporting member supporting a planetary gear which is attached to said second rotatable shaft to rotate therewith and which has a first and second gear parts having different numbers of teeth, in such a way as to allow said planetary gear to rotate about an axis in parallel with said second rotatable shaft;
(b) said second element of said planetary gear mechanism is formed of a first sun gear which engages with said first gear part of said planetary gear; and
(c) said third element of said planetary gear mechanism is formed of a second sun gear which engages with said second gear part of said planetary gear.

Such arrangement provides a planetary gear mechanism with a compact structure and thereby reduces the size of casing thereof. The costs are further cut down.

It may be arranged such that the first and second rotatable shafts act as an input shaft and as an output shaft, respectively.

PREFERRED EMBODIMENT OF THE INVENTION

A preferred embodiment of the present invention is now described below by making reference to the accompanying drawing figures.

Figure 1:
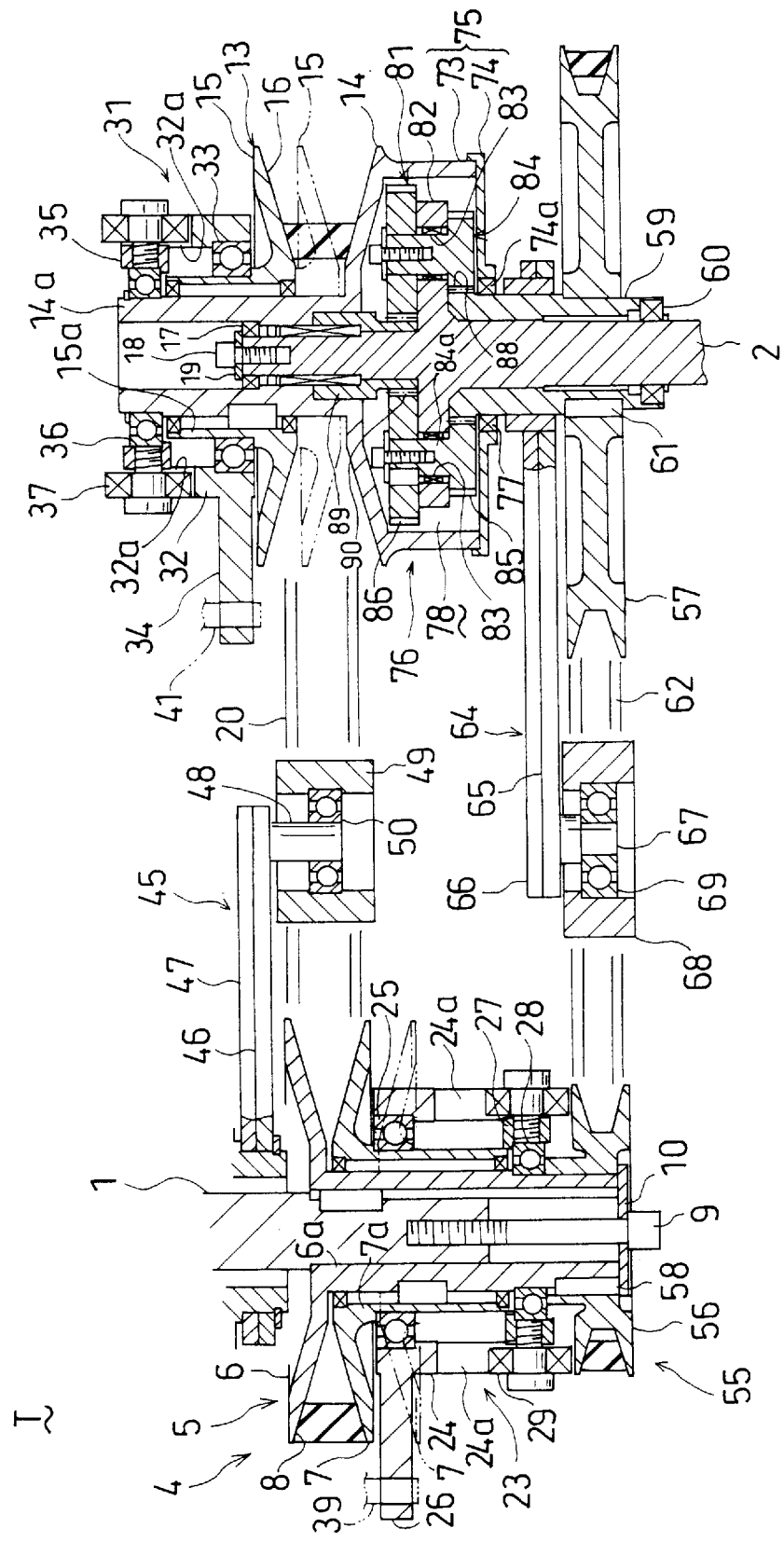
FIG. 1 is a top plan view in cross section of an infinitely variable speed transmission in accordance with the present invention.
Figure 2:
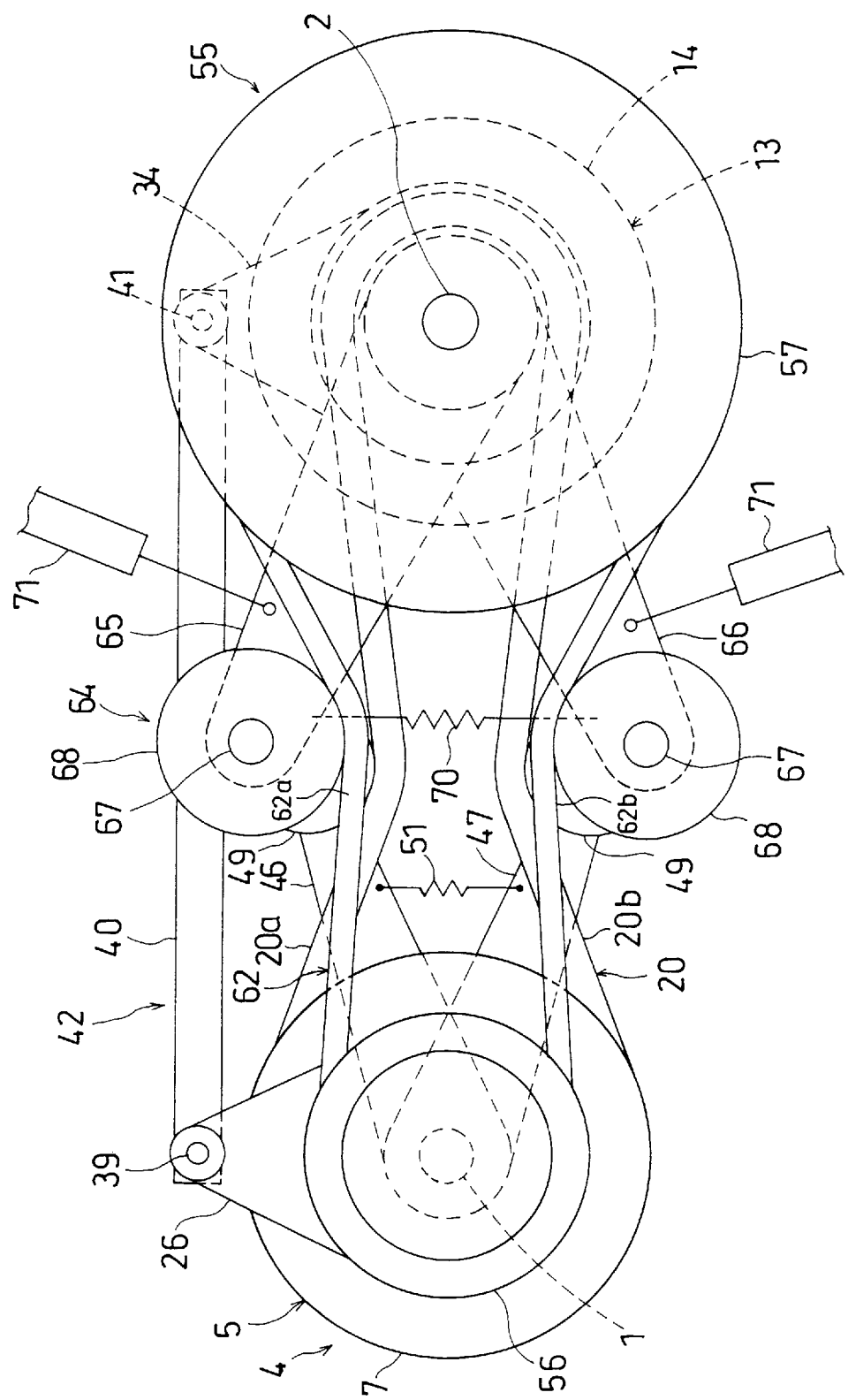
FIG. 2 is a front view schematically showing both a belt transmission mechanism and a belt variable speed mechanism in the infinitely variable speed transmission of the present invention.

FIGS. 1 and 2 each show an entire structure of an infinitely variable speed transmission T made in accordance with the present invention. The transmission T relates to vehicles for lawn mowing and farm operations. More specifically, the transmission T is arranged in a power transmission line between an engine and driving wheels (not shown in the figure).

A first rotatable shaft 1 is drivingly coupled to an engine to form an input section (an input shaft). A second rotatable shaft 2 is drivingly coupled to each driving wheel to form an output section (an output shaft). The first and second rotatable shafts 1 and 2 are arranged in parallel within an approximately horizontal plane in order that the ends of the first and second rotatable shafts 1 and 2 inversely overlap each other when viewed from a horizontal direction.

A belt variable speed mechanism 4 and a belt transmission mechanism 55 are arranged extending between the first and second rotatable shafts 1 and 2. The belt variable speed mechanism 4 has a first variable speed pulley 5 mounted on the first rotatable shaft 1. This first variable speed pulley 5 is made up of a fixed sheave 6 and a movable sheave 7. The fixed sheave 6, which is a flange-like sheave, is key-connected to the first rotatable shaft 1 at a boss portion 6a such that the fixed sheave 6 is rotatable with the first rotatable shaft 1 and nonslidable. The movable sheave 7, a flange-like sheave, is supported on the first rotatable shaft 1 to face the fixed sheave 6, being slidable and relatively rotatable at a boss portion 7a of the movable sheave 7. A pulley groove 8 is formed between the fixed sheave 6 and the movable sheave 7. The boss portion 6a of the fixed sheave 6 projects from the end of the first rotatable shaft 1 for a predetermined length. The boss portion 6a is prevented from slipping off by means of a securing bolt 9 and a washer 10.

A second variable speed pulley 13 having the same diameter as the first variable speed pulley 5 is mounted on the second rotatable shaft 2. The second variable speed pulley 13 is identical in structure with the first variable speed pulley 5. The second pulley 13 is made up of a fixed sheave 14 and a movable sheave 15. The fixed sheave 14, which is a flange-like sheave, is supported on the second rotatable shaft 2 such that the fixed sheave 14 is rotatable and nonslidable at a boss portion 14a of the fixed sheave 14 by means of a bearing member 17. The movable sheave 15, a flange-like sheave, is coupled to the second rotatable shaft 2 such that the movable sheave 15 is slidable and relatively rotatable at a boss portion 15a of the movable sheave 15, wherein the orientation of the movable sheave 15 to the fixed sheave 14 of the second variable speed pulley 13 and the orientation of the movable sheave 7 to the fixed sheave 6 of the first variable speed pulley 5 are in opposite relation. Formed between the fixed sheave 14 and the movable sheave 15 is a pulley groove 16. Additionally, the boss portion 14a of the fixed sheave 14 of the second variable speed pulley 13 projects from the end of the second rotatable shaft 2 for a predetermined length and is prevented from slipping off therefrom by means of a securing bolt 18 and a washer 19 through the bearing member 17.

It is arranged such that a variable speed belt 20, formed of a V belt, runs over the pulley grooves 8 and 16 of the first and second variable speed pulleys 5 and 13. Changes in the belt winding diameter of each of the first and second variable speed pulleys 5 and 13 are made by moving the movable sheaves 7 and 15 nearer to or away from the fixed sheaves 6 and 17. For example, when the movable sheave 7 of the first variable speed pulley 5 is moved nearer to the fixed sheave 6 while the movable sheave 15 of the second variable speed pulley 13 is moved away from the fixed sheave 14, the belt winding diameter of the first variable speed pulley 5 becomes greater than that of the second variable speed pulley 13, whereby rotation of the first variable speed pulley 5 (the first rotatable shaft 1) is accelerated and then transmitted to the second variable speed pulley 13. Conversely, when the movable sheave 7 of the first variable speed pulley 5 is moved away from the fixed sheave 6 while the movable sheave 15 of the second variable speed pulley 13 is moved nearer to the fixed sheave 14, the belt winding diameter of the first variable speed pulley 5 decreases and the belt winding diameter of the second variable speed pulley 13 increases, whereby rotation of the first variable speed pulley 5 (the first rotatable shaft 1) is decelerated and then transmitted to the second variable speed pulley 13.

On the first rotatable shaft 1, a first cam mechanism 23, which acts as a drive mechanism operable to move the movable sheave 7 nearer to or away from the fixed sheave 6, is provided at the rear side of the movable sheave 7 of the first variable speed pulley 5. The cam mechanism 23 has a rotatable cam 24. The rotatable cam 24 is supported in an external engagement manner on the boss portion 7a of the movable sheave 7 such that the rotatable cam 24 is relatively rotatable and axially movable with the movable sheave 7. A pair of inclined cam surfaces 24a and 24a are circumferentially formed at the end of the rotatable cam 24 opposite to the first variable speed pulley 5 at equal angle intervals (180 degrees). A rotatable lever 26 is formed projecting from the periphery of the rotatable cam 24. The rotatable lever 26 rotates with the rotatable cam 24.

A fixed cam 27, which is a tubular cam as a cam follower, is restably supported, through a bearing member 28 on the movable sheave boss portion 7a on the rear side of the rotatable cam 24 projecting from the end of the first rotatable shaft 1. The fixed cam 27 is rigidly coupled to a fixing body (not shown in the figure). Rollers 29 and 29 are rotatably journaled on the fixed cam 27 which roll in contact with the cam surfaces 24a and 24a.

On the second rotatable shaft 2, a second cam mechanism 31 as a drive mechanism operable to move the movable sheave 15 nearer to or away from the fixed sheave 14, is provided on the rear side of the movable sheave 15 of the second variable speed pulley 13. The second cam mechanism 31 is identical in structure with the first cam mechanism 23. The second cam mechanism 31 has a rotatable cam 32. The rotatable cam 32 is supported in an external engagement manner on the boss portion 15a of the movable sheave 15 through a bearing member 33 such that the rotatable cam 32 is relatively rotatable and axially movable with the movable sheave 15. A pair of inclined cam surfaces 32a and 32a are circumferentially formed at the end of the rotatable cam 32 opposite to the second variable speed pulley 13 at equal angle intervals. A rotatable lever 34 is formed projecting from the periphery of the rotatable cam 32. The rotatable lever 34 rotates with the rotatable cam 32.

A fixed cam 35, which is a cam as a cam follower, is restably supported, through a bearing member 36 on the movable sheave boss portion 15a on the rear side of the rotatable cam 32 projecting from the end of the second rotatable shaft 2. The fixed cam 35 is rigidly secured to a fixing body (not shown in the figure). Rollers 37 and 37 are rotatably journaled on the fixed cam 35 which roll in contact with the cam surfaces 32a and 32a.

One end of a link 40 is coupled, through a pin 39, to the end of the rotatable lever 26 of the first cam mechanism 23, and the other end of the link 40 is coupled, through a pin 41, to the end of the rotatable lever 34 of the second cam mechanism 31. The rotatable levers 26 and 34, the link 40, and the pins 39 and 41 together form a linkage mechanism 42. The rotatable cams 24 and 32 of the cam mechanisms 23 and 31 are linked together by the linkage mechanism 42 to rotate around the boss portions 7a and 15a of the movable sheaves 7 and 15, whereby the rollers 29 and 29 and the rollers 37 and 37 roll over the cam surfaces 24a and 24a and over the cam surfaces 32a and 32a, respectively. As a result, the movable sheaves 7 and 15 are axially moved towards or away from the fixed sheaves 6 and 14 and the effective radius of the pulley grooves 8 and 16, i.e., the belt winding diameter of the first and second variable speed pulleys 5 and 13, is varied to make a change in the pulley ratio between the first and second variable speed pulleys 5 and 13.

A variable speed belt tension mechanism 45 is provided. The variable speed belt tension mechanism 45 presses a span 20a or a span 20b of the variable speed belt 20 passing about the first and second variable speed pulleys 5 and 13, whichever becomes a loose-side span, from the outer surface thereof inwardly, to exert upon the variable speed belt 20 a tension. The tension mechanism 45 has a first tension arm 46 and a second tension arm 47. These tension arms 46 and 47 are supported on the first rotatable shaft 1 on the rear side of the fixed sheave 6 of the first variable speed pulley 5 such that the tension arms 46 and 47 are relatively rotatable. Tension shafts 48 and 48, only one of which is shown in the figure, run parallel to the rotatable shafts 1 and 2, the ends of the tension shafts 48 and 48 being rigidly attached to the ends of the tension arms 46 and 47. On the other hand, the other ends of the tension shafts 48 and 48 lie correspondingly to the pulley grooves 8 and 16. Tension pulleys 49 and 49 operable to press both of the spans 20a and 20b of the variable speed belt 20 from the outer surfaces thereof, are rotatably supported by the other ends of the tension shafts 48 and 48 through bearing members 50 and 50, only one of which is shown in the figure. The position of each of the tension pulleys 49 is set such that the outer surface of the tension pulley 49 comes into press contact with a portion of the outer surface of the variable speed belt 20, regardless of the axial movement of the variable speed belt 20 associated with a change in speed.

Additionally, a tension spring 51 is provided which bridges the tension arms 46 and 47 at their middle points. By virtue of spring force by the tension spring 51, the tension arms 46 and 47 are energized to rotate in a clockwise direction and in a counterclockwise direction, respectively. The outer surfaces of the spans 20a and 20b of the variable speed belt 20 are pressed against the tension pulleys 49 and 49, respectively. Rotational energization force, exerted upon the tension arms 46 and 47 by the tension spring 51, is set such that the tension pulleys 49 and 49 press the loose-side spans 20a and 20b with a tension greater than the maximum tension occurring in the loose-side spans 20a and 20b.

The belt transmission mechanism 55 has a first transmission pulley 56 and a second transmission pulley 57. The first transmission pulley 56 is a V-pulley disposed on the first rotatable shaft 1. The second transmission pulley 57 is a V-pulley disposed on the second rotatable shaft 2, having a greater diameter than the first transmission pulley 56. The first transmission pulley 56 is mounted on the end of the movable sheave boss portion 7a of the first variable speed pulley 5 (opposite to the movable sheave 7 in relation to the fixed cam 24), to be rotatable therewith.

On the second rotatable shaft 2, a tubular sleeve 59 is supported, by a bearing member 60, on the rear side of the fixed sheave 14 of the second variable speed pulley 13, to be relatively rotatable. The second transmission pulley 57 is attached to the sleeve 59 with a key 61 to rotate therewith. A transmission belt 62, which is a V-belt, passes about the first and second transmission pulleys 56 and 57.

A transmission belt tension mechanism 64 is provided which is operable to press a span 62a or a span 62b of the transmission belt 62 passing about the first and second transmission pulleys 56 and 57, whichever becomes a loose-side span, from its outer surface inwardly so as to subject the transmission belt 62 to tension. The transmission belt tension mechanism 64 is similar to the variable speed belt tension mechanism 45 and has a first tension arm 65 and a second tension arm 66. The first and second tension arms 65 and 66 are supported by the sleeve 59 on the second rotatable shaft 2 in such a way as to be relatively rotatable. The ends of tension shafts 67 and 67 in parallel with the first and second rotatable shafts 1 and 2 are secured to the ends of the tension arms 65 and 66. The other ends of the tension shafts 67 and 67 lie correspondingly to the pulley grooves of the transmission pulleys 56 and 57. Rotatably supported, through bearing members 69 and 69 (only one of the bearing members is shown in the figure), on the other ends of the tension shafts 67 and 67 are tension pulleys 68 and 68 capable of pressing both of the span 62a and the span 62b of the transmission belt 62 from the outer surfaces thereof.

A tension spring 70 is provided which bridges the tension arms 65 and 66 at their middle points. By spring force by the tension spring 70, the tension arm 65 is energized to rotate in a counterclockwise direction and the tension arm 66 is energized to rotate in a clockwise direction, whereby the tension pulleys 68 and 68 press theouter surfaces of the spans 62a and 62b of the transmission belt 62.

Both of the tension arms 65 and 66 are drivingly coupled to actuators 71 and 71 (for example, air cylinders). By virtue of the actuators 71 and 71, the tension arms 65 and 66 are forced to rotate, against the spring's 79 energization force, in an opposite direction to a belt pressing direction. The transmission belt tension mechanism 64 forms a tension clutch in which application of pressure to the transmission belt 62 is brought to a halt by the operation of the actuator 71 to cut off the transmission of power between the transmission pulleys 56 and 57 (i.e., in the transmission T).

As shown in FIG. 1, a tubular part 73, which extends coaxially with the second rotatable shaft 2 to move away from the movable sheave 15, is integrally formed at an outer edge portion of the fixed sheave 14 of the second variable speed pulley 13. The peripheral edge of a disk member 74 with a central hole 74a defined in its center through which the sleeve 59 passes, is rigidly joined to the end of the tubular part 73 in a liquid-tight manner. A seal member 77 is provided to establish liquid-tight sealing between the periphery of the hole 74a and the peripheral surface of the sleeve 59. Accordingly, the tubular part 73 and the disk member 74 together form a covering part 75 extending from the peripheral edge of the fixed sheave 14 to the periphery of the second rotatable shaft 2. The covering part 75 and the fixed sheave 14 together form a gear casing 76. Defined on the rear side of the fixed sheave 14 is an enclosed gear housing space 78 that is covered with the gear casing 76.

A planetary gear mechanism 81 is disposed on the second rotatable shaft 2, being housed in gear housing space 78. The planetary gear mechanism 81 includes a first, a second, and a third element. The first to third elements are linked together. A disk-like flange 82 as the first element (the supporting member) is joined to the periphery of the second rotatable shaft 2 facing the gear housing space 78 to rotate therewith. A plurality of shaft holes 83 are formed passing through the flange 82. More specifically, the holes 83 are defined at locations of the flange 82 along the same radial direction at equal intervals in a circumferential direction, and the planetary gear 84 is supported, at a shaft part 84a having an axis parallel to the second rotatable shaft 2, in the hole 83. A first gear part 85 is integrally formed with one end of the shaft part 84a of the planetary gear 84 on the side of the second transmission pulley 57, and a second gear part 86 is attached to the other end on the side of the movable sheave 15 to rotate therewith.

Formed on the periphery of an end of the sleeve 59 which is relatively rotatable in relation to the second rotatable shaft 2 facing the gear housing space 78, is a first sun gear 88 as the second element. The sun gear 88 engages the first gear part 85 of the planetary gear 84. The sun gear 88 (the second element) is drivingly coupled, by way of the sleeve 59, to the second transmission pulley 57 of the second rotatable shaft 2.

A tubular gear formation part 89, which is an extension from the boss portion 14a into the gear housing space 78, is integrally formed at the back of the fixed sheave 14 in the second variable speed pulley 13. Formed on the periphery of the gear formation part 89 is a second sun gear 90 as the third element. The second sun gear 90 engages the second gear part 86 of the planetary gear 84. As a result of such arrangement, the second sun gear 90, i.e., the third element, is drivingly coupled to the fixed sheave 14 of the second variable speed pulley 13 on the second rotatable shaft 2 by the gear formation part 89.

A control lever is coupled, through a rod, to the end of the rotatable lever 34 of the cam mechanism 31 in the linkage mechanism 42 of the belt variable speed mechanism 4, which is not shown in the figure. This control lever swivels about, for example, a swivel axis. The linkage mechanism 42 is made operative by the switch operation of the control lever. This causes the rotatable levers 26 and 34 projecting from the rotatable cams 24 and 32 to switch between an advance maximum speed position, a neutral position, and a retract maximum speed position and thereby makes a change in the pulley ratio of the belt variable speed mechanism 4. With respect to the first rotatable shaft 1 (the input section), the flange 82 and the second rotatable shaft 2 (the output section) are switched among forward, neutral, and backward for the varying of speed, and by virtue of the balance of pressing force of the variable speed belt 20 between the movable sheaves 7 and 15 of the variable speed pulleys 5 and 13 in the belt variable speed mechanism 4, the adjustment of transition to the neutral state becomes possible.

In the vehicle forward state in which the second rotatable shaft 2 (the output shaft) is made to rotate in one direction with respect to the first rotatable shaft 1 (the input shaft) by setting a gear ratio between each element of the planetary gear 81 as well as by setting the pulley ratio of the belt transmission mechanism 55 to the planetary gear 81, it is arranged such that the sun gear 88, drivingly coupled by way of the belt tension mechanism 55 to the first rotatable shaft 1, rotates at a higher velocity than the sun gear 90 which is drivingly coupled by way of the belt variable speed mechanism 4 to the first rotatable shaft 1.

The working of the present embodiment is now described. The first rotatable shaft 1 of the infinitely variable speed transmission T is drivingly coupled to an engine mounted on a vehicle, and the second rotatable shaft 2, which is integral with the flange 82 supporting the planetary gear 84 of the planetary gear mechanism 81, is drivingly coupled to driving wheels of the vehicle, whereby rotational force from the engine is varied in velocity in the transmission T and is then transmitted to the driving wheels. The belt variable speed mechanism 4 and the belt transmission mechanism 55 are arranged in parallel in the power transmission line between the first rotatable shaft 1 (the input section) and the second rotatable shaft 2 (the output section) in the transmission T. As a result of such arrangement, power from the first rotatable shaft 1 is first transmitted to the belt variable speed mechanism 4 and to the belt transmission mechanism 55 and is then provided, as output power, from the second rotatable shaft 2 by way of the flange 82 of the planetary gear mechanism 81, at the time when the transmission T is on.

NEUTRAL STATE

When the control lever is in a neutral position, the flange 82 of the planetary gear mechanism 81 and the second rotatable shaft 2 each stop rotating, and the infinitely variable speed transmission T is placed in the neutral state. As a result, there is no transmutation of power from the engine to the driving wheels. The vehicle is brought to a halt.

In the neutral state described above, each of the first and second pulleys 5 and 13 of the belt variable speed mechanism 4 is a drive pulley or a driven pulley.

By virtue of the spring action of the tension spring 70 of the transmission belt tension mechanism 64, the tension arms 65 and 66 are energized in such a way as to rotate in a counterclockwise direction and in a clockwise direction, respectively. When the control lever is in the neutral position, the tension pulley 68 at the end of the first tension arm 65 and the tension pulley 68 at the end of the second tension arm 66 respectively press the outer surface of the span 62a and the outer surface of the span 62b, with the same level of pressing force. Additionally, by virtue of the spring action of the tension spring 51 of the variable speed belt tension mechanism 64, the first and second tension arms 46 and 47 are energized in such a way as to rotate in a clockwise direction and in a counterclockwise direction, respectively. The tension pulley 49 at the end of the first tension arm 46 and the tension pulley 49 at the end of the second tension arm 47 respectively press the outer surface of the span 20a and the outer surface of the span 20b, with the same level of pressing force.

In the belt variable speed mechanism 4, the fixed sheaves 6, 14 and the movable sheaves 7,15 are disposed such that the orientation of the movable sheave 6 to the fixed sheave 7 of the first variable speed pulley 5 is in opposite relation to the orientation of the movable sheave 15 to the fixed sheave 14 of the second variable speed pulley 13, as shown in the figure. The cam mechanisms 23 and 31 operable to move the movable sheaves 7 and 15 nearer to or away from the fixed sheaves 6 and 14, are linked together by the linkage mechanism 42. As a result of such linkage, an axial pressing force exerted by the variable speed belt 20 upon the variable speed pulley 5 is canceled by another axial pressure exerted by the variable speed belt 20 upon the variable speed pulley 13. In the neutral state, the variable speed pulleys 5 and 13 each become a drive pulley or a driven pulley, thereby balancing the distribution of tension exerted by the variable speed belt 20 upon the variable speed pulleys 5 and 13. As a result, the variable speed belt 20 presses the pulleys 5 and 13 with the same level of pressing force. The difference between pressing force applied by the variable speed belt 20 to the pulley 5 and pressing force applied by the belt 20 to the pulley 13 becomes zero.

If in the neutral state the rotation of the second rotatable shaft 2 with respect to the first rotatable shaft 1 slightly changes in the direction of forward or backward, this causes the belt winding diameter of one of the first and second pulleys 5 and 6 to become greater than that of the other pulley. A state of lacking balance in the distribution of tension by the variable speed belt 20 at the pulleys 5 an 13 is produced, and an effective tension for the variable speed belt 20 occurs. The pulley 5 or the pulley 13, whichever undergoes an increase in the belt winding diameter, becomes a drive pulley and the remaining one that undergoes a decrease in the belt winding diameter becomes a driven pulley. The belt pressing force of the driven pulley is greater than that of the driven pulley. The difference in belt pressing force between the drive pulley and the driven pulley increases as the load increases. Even when the infinitely variable speed transmission T makes a slight transition from its neutral state, there will be produced a difference in belt pressing force between the variable speed pulleys 5 and 13 in spite of the fact that there is a cancellation in belt pressing force between the pulleys 5 and 13. Due to such a difference in belt pressing force, there is a change that the increased belt winding diameter of the drive pulley is reduced and a restoring force of automatically bringing the transmission T back to the neutral state occurs. The transmission T itself has a self-lock function of reverting to the neutral state. This makes it possible to stably maintain the neutral state, therefore preventing the vehicle from moving suddenly. This provides an improved vehicle stop stability in the neutral state.

In such a neutral state, both of the spans 62a and 62b of the transmission belt 62 of the belt transmission mechanism 55 become loose. However, these loose-side spans 62a and 62b are pressed at their outer surfaces by the tension pulleys 68 and 68 of the tension arms 65 and 66 in the transmission belt tension mechanisms 64, whereby the transmission belt 62 is in tension.

MOVING FORWARD

The lever 26 of the cam mechanism 23 in the variable speed pulley 5 and the level 34 of the cam mechanism 31 in the variable speed pulley 13 are linked together by the link 40. By making a change in the pulley ratio of the belt variable speed mechanism 4 by the switch operation of the control lever, the output rotation of the flange 82 of the planetary gear mechanism 81 (the second rotatable shaft 2), i.e., the output rotation of the transmission T, can be changed to the forward state or to the backward state and the rotation speed thereof can vary to increase.

When the operation lever is shifted from neutral to forward, the rotatable cam 32, since the control lever is coupled to the rotatable lever 34 on the periphery of the rotatable cam 32 in the second cam mechanism 31, has the rollers 37 and 37 roll over the cam surfaces 32a and 32a while at the same time turning around the boss portion 15a of the movable sheave 15 in the second variable speed pulley 13, in one direction. The cam surface 32a is pressed against the roller 37 and the rotatable cam 32 moves over the second rotatable shaft 2. The movable sheave 15, which moves together with the rotatable cam 32 through the bearing member 33, moves in the direction of the fixed sheave 14. As a result, the second variable speed pulley 13 is closed and its belt winding diameter increases in comparison with the neutral state. Because of such an increase in the belt winding diameter, the variable speed belt 20 is drawn in the direction of the second variable speed pulley 13.

With the switching of the control lever to the forward position, the rotatable cam 24 of the first cam mechanism 23 rotates on the first rotatable shaft 1 in the same direction as the rotatable cam 32 of the second cam mechanism 31, in synchronism with the movement of the movable sheave 15 of the second variable speed pulley 13. By virtue of the rotation of the rotatable cam 24, the action of pressing against the roller 29 disappears. As a result, tension, exerted by the variable speed belt 20 which moves in the direction of the second variable speed pulley 13, allows the cam 24 and the movable sheave 7 coupled by way of the bearing member 25 to the cam 24 to move away from the fixed sheave 6 on the first rotatable shaft 1. The first variable speed pulley 5 is opened by the separation of the movable sheave 7 from the fixed sheave 6. The belt winding diameter of the first variable speed pulley 5 decreases in comparison with the neutral state. As a result, the belt winding diameter of the second variable speed pulley 13 becomes greater than that of the first variable speed pulley 5, and rotation of the second rotatable shaft 2 is accelerated and then transmitted to the first rotatable shaft 1. At this pulley ratio, the second rotatable shaft 2 rotates in one direction in relation to the first rotatable shaft 1 and the driving wheels are driven by output power from the engine to rotate in an advance direction of the vehicle. By changing a pulley ratio to an advance maximum speed position, the rotational speed of the second rotatable shaft 2 in the forward direction, i.e., the advance speed, can be increased.

According to the setting of gear ratio between each element of the planetary gear mechanism 81 and according to the setting of pulley ratio of the belt transmission mechanism 55 to the planetary gear mechanism 81, it is set such that, in the vehicle forward (advance) state, the first sun gear 88 drivingly coupled by way of the belt transmission mechanism 55 to the first rotatable shaft 1 rotates at a higher velocity than the second sun gear 90 coupled by way of the belt variable speed mechanism 4 to the first rotatable shaft 1. The first sun gear 88 rotates faster than the second sun gear 90, and the flange 82 and the second rotatable shaft 2 each rotate in the same direction that the first sun gear 88 rotates. In this condition, it is required to make the drive power of the first sun gear 88 greater than that of the second sun gear 90, and therefore drive power is transmitted to the first sun gear 88 by way of the belt transmission mechanism 55. The excess power is transmitted, as circulation power, from the second sun gear 90, by way of the belt variable speed mechanism 4, to the first rotatable shaft 1. To sum up, input power to the first rotatable shaft 1 is divided into two types of power, namely drive power and circulation power. The drive power, on the one hand, is transmitted in a drive power line extending to the flange 82 (the second rotatable shaft 19) by way of the belt transmission mechanism 55 and the first sun gear 88 of the planetary gear mechanism 88. The circulation power, on the other hand, is transmitted in a circulation power line extending from the second sun gear 90 to the belt variable speed mechanism 4. Generally, in vehicles, the frequency of being in the forward state is higher than the frequency of being in the backward state. Arrangement that the belt variable speed mechanism 4 becomes a circulation power line in the forward state, achieves more frequent transmission of circulation power smaller than drive power to the variable speed belt 20 for a long period of time. This makes it possible to diminish the transmission load of the variable speed belt 20 even at the high output time in the forward state.

Further, in the state in which the belt variable speed mechanism 4 becomes a circulation power line, circulation power is transmitted from the second sun gear 90 of the planetary gear mechanism 82 to the first rotatable shaft 1 by way of the belt variable speed mechanism 4. The second variable speed pulley 13 acts as a drive pulley, while on the other hand the first variable speed pulley 5 acts as a driven pulley. The span 20a of the variable speed belt 20 becomes loose. However, since both the first tension arm 46 and the second tension arm 47 are energized to rotate in opposite rotational directions by the tension spring 51 in order that the tension pulley 49 of the first tension arm 46 and the tension pulley 49 of the second tension arm 47 exert force against the span 20a and the span 20b. The tension pulley 49 of the second tension arm 46 pressing the outer surface of the tension-side span 20b moves downwardly and the second tension arm 47 is turned clockwise. As a result, the tension spring 51 extends. Correspondingly, the first tension arm 46 also rotates in a clockwise direction. The tension pulley 49 of the first tension arm 46 exerts a predetermined level of force against the outer surface of the loose-side span 20a of the variable speed belt 20, to produce a belt tension.

By energization force exerted by the tension spring 51 of the tension mechanism 45, the first and second tension arms 46 and 47 are energized to rotate in opposite directions, and the tension pulleys 49 and 49 of the tension arms 46 and 47 press the outer surfaces of the loose-side spans 20a and 20b of the variable speed belt 20, thereby applying a tension to the variable speed belt 20. This tension thus applied is greater than a maximum tension produced in the loose-side spans 20a and 20b, therefore providing wedge effects to the pulleys 5 and 13 of the variable speed belt 20 to produce a pressing force. By the produced pressing force, power is transmitted between the pulleys 5 and 13 through the variable speed belt 20.

Additionally, the tension arms 65 and 66 of the transmission belt tension mechanism 64 work in the same way as the variable speed belt tension mechanism 45, and the span 62a of the transmission belt 62 of the belt transmission mechanism 55 becomes a tension-side span while the span 62b becomes a loose-side span. As a result, the first tension arm 65 is rotated clockwise and the second tension arm 66 is then pulled by the first tension arm 65 through the tension spring 70 to rotate in the same direction as the first tension arm 65. The tension pulley 68 of the second tension arm 66 exerts pressing force upon the loose-side span of the transmission belt 62.

MOVING BACKWARD

The control lever is put in a backward position. In the state of switching to the backward position, the cam 24 of the first cam mechanism 24, while having the cam roller 29 rotate over the cam surface 24a, turns around the boss portion 7a of the movable sheave 7 in the first variable speed pulley 5 in a different direction. The cam surface 24a is then pressed against the roller 29 and the cam 24 moves over the first rotatable shaft 1. The movable sheave 7, which moves together with the cam 24, moves in the same direction that the cam 24 moves. In this way, the movable sheave 7 is moved closer to the fixed sheave 6. As a result, the first variable speed pulley 5 becomes closed and its belt winding diameter is increased in comparison with the neutral state's belt winding diameter thereof. The variable speed belt 20 is drawn in the direction of the first variable speed pulley 5 by such an increase in the belt winding diameter of the first variable speed pulley 5.

Additionally, with the positional switching of the control lever to a backward position, the cam 32 of the second cam mechanism 31 rotates over the second rotatable shaft 2 in the same direction that the cam 24 of the first cam mechanism 23 rotates. The action of pressing against the cam roller 37 is no longer applied by the rotation of the cam 32.

The cam 32 and the movable sheave 15 coupled by way of the bearing member 33 to the cam 32 move away from the fixed sheave 14 on the second rotatable shaft 2 by tension of the variable speed belt 20 moving towards the first variable speed pulley 5. The separation of the movable sheave 15 from the fixed sheave 14 causes the second variable speed pulley 13 to open, whereby the belt winding diameter of the pulley 13 is decreased in comparison with the neutral state's belt winding diameter thereof. As a result, the belt winding diameter of the first variable speed pulley 5 becomes greater than that of the second variable speed pulley 13. Rotation of the first rotatable shaft 1 is accelerated and then transmitted to the second rotatable shaft 2. At this pulley ratio, the second rotatable shaft 2 rotes in another direction in relation to the first rotatable shaft 1. The driving wheels of the vehicle are driven to rotate in a backward direction by the output power of the engine. A change in the pulley ratio to a backward maximum speed position can increase the speed of backward rotation of the second rotatable shaft 2, in other words the rate of backward movement is accelerated.

At this point in time, the second sun gear 90 rotates faster than the first sun gear 88, having the flange 82 and the second rotatable shaft 2 rotate in an opposite direction to the first sun gear 88. In this state, it is necessary to make the drive power of the second sun gear 90 greater than that of the first sun gear 88. Therefore, drive power is transmitted by way of the belt variable speed mechanism 4 to the second sun gear 90, and the excess power is transmitted, as circulation power, from the first sun gear 88 to the first rotatable shaft 1 by way of the belt transmission mechanism 55. Conversely to the advance (forward) state, input power to the first rotatable shaft 1 is divided into two types of power, namely drive power and circulation power. The drive power is transmitted in a drive power line extending from the belt variable speed mechanism 4 to the second sun gear 90 of the planetary gear mechanism 81 on the second rotatable shaft 2. The circulation power is transmitted in a circulation power line extending from the first sun gear 88 of the planetary gear mechanism 81 to the first rotatable shaft 1 by way of the belt transmission mechanism 55. Transmission of great drive power to the belt variable speed mechanism 4 may give rise to decreasing the durability of the variable speed belt 20. However, as previously mentioned, the frequency that vehicles are in the backward state is in general lower that the frequency that vehicles are in the forward state, in other words the variable speed belt 20 carries a great transmission load, only for a very short time. Therefore, the variable speed belt 20 does not suffer a drop in durability.

In the backward state, as described above, driving power is transmitted from the first rotatable shaft 1 to the second sun gear 90 of the planetary gear mechanism 81 on the second rotatable shaft 2, and the first variable speed pulley 5 becomes a drive pulley while on the other hand the second variable speed pulley 13 becomes a driven pulley. The span 20b of the variable speed belt 20 becomes loose. Also in this point in time, both the tension arm 46 and the tension arm 47 are energized by the tension spring 51 to rotate in opposite rotational directions. Accordingly, the tension pulley 49 of the first tension arm 46 pressing the outer surface of the tension-side span 20a moves upwardly and the first tension arm 46 is rotated counterclockwise. By spring force exerted by the tension spring 51, the second tension arm 47 is also rotated counterclockwise and the tension pulley 49 exerts a predetermined pressing force upon the outer surface of the span 20b of the variable speed belt 20 which becomes loose, to produce a belt tension.

Additionally, the tension arms 65 and 66 of the transmission belt tension mechanism 64 work in the same way as the variable speed belt tension mechanism 45. The span 62a of the transmission belt 62 of the belt transmission mechanism 55 becomes a loose-side span while on the other hand the span 62b becomes a tension-side span, and the second tension arm 66 is rotated counterclockwise. The first tension arm 65 is then pulled by the second tension arm 66 through the tension spring 70 to rotate in the same direction as the second tension arm 66. The tension pulley 68 of the first tension arm 65 exerts pressing force upon the loose-side span of the transmission belt 62.

In accordance with the present embodiment of this invention, the gear ratio of the planetary gear mechanism 81 and the pulley ratio of the belt transmission mechanism 55 to the planetary gear mechanism 81 are set so that, in the vehicle forward state, the first sun gear 88 drivingly coupled through the belt transmission mechanism 55 to the first rotatable shaft 1 can always rotate faster than the second sun gear 90 driving coupled through the belt variable speed mechanism 4 to the first rotatable shaft 1. As a result of such arrangement, it becomes possible to increase the frequency that small circulation power is transmitted to the variable speed belt 20 of the belt variable speed mechanism 4 and it becomes also possible to reduce the frequency of great drive power is transmitted to the variable speed belt 20. This makes it possible to easily obtain the transmission's T forward/reverse states without the provision of a special forward/reverse mechanism, while relieving the load of the variable speed belt 20.

The rotatable cams 24 and 32 of the cam mechanisms 23 and 31 are supported through the bearing members 25 and 32 on the boss portions 7a and 15a of the movable sheaves 7 and 15 in the variable speed pulleys 5 and 13 of the belt variable speed mechanism 4, and the rotatable levers 26 and 34 on the peripheries of the rotatable cams 24 and 32 are linked together by a single link (the link 40). When the belt variable speed mechanism 4 undergoes a change in velocity, the rollers 29 and 37, supported on the fixed cams 27 and 35 on the cam surfaces 24a and 32a of the rotatable cams 24 and 32, exerts force in directions normal to the cam surfaces 24a and 32a. When a normal (right-angle) component of the exerted force in a direction orthogonal to the rotatable shafts 1 and 2 is applied at right angles to a line connecting the axis of the rotatable shafts 1 and 2 and its coupling point to the link 40, a cam rotational reaction force, which is perpendicular to the connecting line and in an opposite direction to the normal component force, is generated, regardless of a change in the pulley ratio. This cam rotational reaction force is exerted on each boss portion 7a and 15a in such a way that the boss portion is pressed at the center of a belt winding range of the variable speed belt 20 for the pulleys 5 and 13. In other words, a cam rotational reaction force against the boss portions 7a and 15a works at clearances in the sliding parts between the boss portions 7a, 15a and the first and second rotatable shafts 1 and 2 in such a manner that a moment, which is opposite to another that causes the movable sheaves 7 and 15 to incline towards the first and second rotatable shafts 1 and 2 when the variable speed belt 20 applies a pressing force to the movable sheaves 7 and 15, is produced. The original moment is canceled by such a produced moment to diminish. The distribution of surface pressure of the inner peripheral surfaces of the boss portions 7a and 15a of the movable sheaves 7 and 15 to the outer peripheral surfaces of the rotatable shafts 1 and 2, is dispersed in the direction of shaft center, and the resistance of sliding of the boss portions 7a and 15a is decreased. By a proportional amount to such a decrease in the sliding resistance, the load of belt pressing force applied by the rotatable cams 24 and 32 to a fixed point (i.e., the taken-out pressing force) increases. In other words, belt generation pressing force is transmitted as a taken-out pressing force to the rotatable cams 24 and 32 without great resistance. The difference between the belt generation pressing force and the taken-out pressing force is a load necessary for varying-speed control (control force) so that, when making a change in the pulley ratio, the required operating force decreases as the taken-out pressing force increases. As a result of such arrangement, resistance at the time of making a transition to the neutral state is reduced by a balance in the pressing force of the variable speed belt 20 between the variable speed pulleys 5 and 13, therefore providing smooth adjustment to the neutral state. The neutral state can be maintained with much better stability.

The first and second tension arms 46 and 47 in the variable speed belt tension mechanism 45 are energized by the tension spring 51 to rotate in opposite directions in order that the tension pulley 49 of the first tension arm 46 and the tension pulley 49 of the second tension arm 47 continuously press the span 20a and the span 20b of the variable speed belt 20, respectively, whereby pressing force against the loose-side span 20b (or the span 20a) is obtained by the act of returning of the tension-side span 20a (or the span 20b). Accordingly, even when the act of switching to the forward state or to the backward state causes the spans to switch between "loose" and "tension", it is possible to automatically press a loose-side span while maintaining a predetermined distance between the tension pulleys 49 and 49.

Additionally, the tension arms 46 and 47 are energized to rotate by the tension spring 51. This eliminates spring buckling which may occur when compression springs are employed. As a result, an adequate spring constant can be obtained and there is produced an advantage to stabilize a belt tension. In stead of using the tension pulleys 49 and 49 for pressing the outer surfaces of the spans 20a and 20b, a pair of tension pulleys may be arranged such that the tension pulleys press the inner surfaces of the spans 20a and 20b of the variable speed belt 20, and tension arms supporting the tension pulleys are energized by a compression spring or by a tension spring to rotate in a belt pressing direction. When a tension spring is used, an arm for mounting the tension spring is formed on one of the tension arms, projecting therefrom, and the tension spring is bridged between the spring mounting arm and the other tension arm so that the tension arms are energized to rotate in opposite directions.

For the transmission belt tension mechanism 64, the same operation effects that the variable speed belt tension mechanisms 45 provides are obtained.

Further, the planetary gear mechanism 81 is disposed on the second rotatable shaft 2, and one drive force transmission line including the belt variable speed mechanism 4 and the other drive force transmission line including the belt transmission mechanism 55 are arranged in parallel between the first rotatable shaft 1 and the second rotatable shaft 2. It is arranged such that the variable speed belt 20 of the belt variable speed mechanism 4 and the transmission belt 62 of the belt transmission mechanism 55 pass over the first and second rotatable shafts 1 and 2. Because of such an arrangement, the distance between the first rotatable shaft 1 and the second rotatable shaft 2 can be changed by simply replacing the belts 20 and 62 with ones having a different length. Unlike a case in which a drive force transmission line is formed using a transmission gear mechanism, changes in design can be made easily.

The variable speed belt 20 of the belt variable speed mechanism 4 and the transmission belt 62 of the belt transmission mechanism 55 pass over the first and second rotatable shafts 1 and 2. This makes it possible to assemble the transmission T by just running two belts (the belts 20 and 62) over the first and second rotatable shafts 1 and 2. In other words, this transmission T may be dealt with in the same way as dealing with commonly-used belt transmissions.

In addition, these belts 20 and 62 can be used in an exposed manner and there is no need to cover the belts 20 and 62 with a large casing. Only the planetary gear mechanism 81 is required to be covered with the gear case 76. Defined at the back of the fixed sheave 14 of the second variable speed pulley 13 on the second rotatable shaft 2 in the belt variable speed mechanism 4 is the gear housing space 78 that is enclosed by the gear case 76 including the fixed sheave 14. The planetary gear mechanism 81 is, sealably from the outside and liquid tightly, housed in the gear housing space 78. The gear case 76 of the planetary gear mechanism 81 contains as a subordinate part thereof the fixed sheave 14 of the second variable speed pulley 13, thereby making itself compact in size. This contributes to a reduction of the cost of the transmission T.

The planetary gear mechanism 81 comprises the flange 82 attached to the second rotatable shaft 2 in such a way as to be rotatable therewith, the planetary gear 84 including the first and second gear parts 85 and 86 differing from each other in the number of teeth, the first sun gear 88 which engages the first gear part 85 of the planetary gear 84, and the second sun gear 90 which engages the second gear part 86 of the planetary gear 84. As a result of such arrangement, the planetary gear mechanism 81 becomes compact in size. This further reduces the size of the gear case 76. The cost of the transmission T is further reduced.

Both of the tension arms 65 and 66 of the transmission belt tension mechanism 64 are coupled to the actuators 71 and 71 operable to rotate, against the energization force of the tension spring 70, the tension arms 65 and 66 in an opposite direction to a belt pressing direction. Transmission of drive force between the first and second rotatable shafts 1 and 2 (i.e., between the input and output shafts) can be cut off immediately. More specifically, the actuators 71 and 71 are made operative to stop the transmission belt tension mechanism 64 from applying a pressing force onto the transmission belt 62, to cut off transmission of drive force between the transmission pulleys 56 and 57 (i.e., in the transmission T). The transmission belt tension mechanism 64 may be used as an emergency clutch, wherein in the belt transmission mechanism 55 the transmission belt 62 does not move much, unlike the variable speed belt 20 of the belt variable speed mechanism 4. Since the movement range of the belt spans 62a and 62b is narrow, this provides stable clutch effects.

In the foregoing embodiment of the present invention, the flange 82 of the planetary gear mechanism 81 is formed integrally with the second rotatable shaft 2, the first sun gear 88 is coupled to the second transmission pulley 57 of the belt transmission mechanism 55, and the second sun gear 90 is coupled to the second variable speed pulley 13 of the belt variable speed mechanism 4; in other words, it is sufficient that one of the three elements of the planetary gear mechanism 81 is coupled to the second transmission pulley 57, another of the three elements is coupled to the second variable speed pulley 13, and the remaining element is coupled to the second rotatable shaft 2.

Conversely to the foregoing embodiment, the second rotatable shaft 2 may act as a power input section and the first rotatable shaft 1 may act as a power output section.

It is arranged in the foregoing embodiment such that circulation power is transmitted to the belt variable speed mechanism 4 in the vehicle forward state. However, if the frequency of being in the backward state is higher than the frequency of being in the forward state, circulation power may be worked on the variable speed belt 20 in the backward state.

The invention claimed is:

1. An infinitely variable speed transmission comprising:
   (a) a first and second rotatable shafts which are arranged to be parallel to each other;
   (b) a belt transmission mechanism including:
      a first transmission pulley which is rigidly secured to said first rotatable shaft to rotate therewith;
      a second transmission pulley which is supported on said second rotatable shaft;
      a transmission belt which passes about said first and second transmission pulleys;
      a transmission belt tension mechanism which presses a loose-side span of said transmission belt to exert upon said transmission belt a tension;
   (c) a belt variable speed mechanism including:
      (i) a first variable speed pulley which has a fixed sheave and a movable sheave;
         said fixed sheave being rigidly secured to said first rotatable shaft to rotate therewith;
         said movable sheave being supported on said first rotatable shaft to be axially movable;
      (ii) a second variable speed pulley which has a fixed sheave and a movable sheave;
         said fixed sheave being rotatably secured onto said second rotatable shaft;
         said movable sheave being supported on said second rotatable shaft to be axially movable;
      (iii) a variable speed belt which passes about said first and second variable speed pulleys;
      (iv) a pair of drive mechanisms which move said movable sheaves nearer to or away from said fixed sheaves located opposite to said movable sheaves to make a change in the belt winding diameter of said first and second variable speed pulleys;
      (v) a linkage mechanism which interlocks said pair of drive mechanisms with each other in order that the belt winding diameter of said first variable speed pulley and the belt winding diameter of said second variable speed pulley vary in opposite directions, to make a change in the pulley ratio between said first and second variable speed pulleys;
      (vi) a variable speed belt tension mechanism which presses a loose-side span of said variable speed belt to exert upon said variable speed belt a tension;
      wherein an enclosed gear housing space is defined at the back of said fixed sheave of said second variable speed pulley, and wherein said gear housing space is covered with a gear casing formed by said fixed sheave of said second variable speed pulley and a cover part extending from the outer periphery of said fixed sheave of said second variable speed pulley to the outer periphery of said second rotatable shaft; and
   (d) a planetary gear mechanism;
      said planetary gear mechanism being housed in said gear housing space and mounted on said second rotatable shaft;
      said planetary gear mechanism having a first, a second, and a third element;
      said first element being drivingly coupled to said second rotatable shaft;
      said second element being drivingly coupled to said second transmission pulley on said second rotatable shaft;
      said third element being drivingly coupled to said second variable speed pulley on said second rotatable shaft;
      wherein by virtue of said change in the pulley ratio between said first and second variable speed pulleys made by said linkage mechanism, the action of switching among (A) a forward state in which one of said first and second rotatable shafts rotates in one direction in relation to the other of said first and second rotatable shafts, (B) a neutral state in which one of said first and second rotatable shafts stops rotating, and (C) a backward state in which one of said first and second rotatable shafts rotates in an opposite direction to said one direction in relation to the other of said first and second rotatable shafts, is carried out for the varying of speed; and
      wherein in said belt variable speed mechanism said variable speed belt exerts respective pressing forces to press said movable sheaves of said first and second variable speed pulleys in the axial directions of said first and second rotatable shafts through said linkage mechanism and said drive mechanisms, and restoration to said neutral state is performed by a difference between said pressing forces.

2. An infinitely variable speed transmission according to claim 1,
   wherein:
      (a) the orientation of said movable sheave to said fixed sheave of said first variable speed pulley is in opposite relation to the orientation of said movable sheave to said fixed sheave of said second variable speed pulley, in said belt variable speed mechanism;
      (b) each said drive mechanism is a cam mechanism;
      (c) said cam mechanism includes a tubular rotatable cam which is rotatably supported on a boss portion of said movable sheave of said variable speed pulley through a bearing member, and a fixed cam which is in cam contact with said rotatable cam;
      (d) a cam surface is formed at one of said rotatable cam and said fixed cam while the other of said rotatable cam and said fixed cam acts as a cam follower in contact with said cam surface, and said movable sheave is axially moved by relative rotation of said rotatable cam and said fixed cam; and
      (e) said linkage mechanism is provided with a link for coupling together said rotatable cams of said cam mechanisms.

3. An infinitely variable speed transmission according to claim 1 wherein said transmission belt tension mechanism of said belt transmission mechanism is constructed in such a way as to stop pressing said transmission belt for cutting off power transmission by said transmission belt between said first and second transmission pulleys.

4. An infinitely variable speed transmission according to claim 2 wherein said transmission belt tension mechanism of said belt transmission mechanism is constructed in such a way as to stop pressing said transmission belt for cutting off power transmission by said transmission belt between said first and second transmission pulleys.

5. An infinitely variable speed transmission according to claim 1,
   wherein:
      (a) said first element of said planetary gear mechanism is formed of a supporting member;

said supporting member supporting a planetary gear which is attached to said second rotatable shaft to rotate therewith and which has a first and second gear parts having different numbers of teeth, in such a way as to allow said planetary gear to rotate about an axis in parallel with said second rotatable shaft;

(b) said second element of said planetary gear mechanism is formed of a first sun gear which engages with said first gear part of said planetary gear; and (c) said third element of said planetary gear mechanism is formed of a second sun gear which engages with said second gear part of said planetary gear.

6. An infinitely variable speed transmission according to claim 2, wherein:

(a) said first element of said planetary gear mechanism is formed of a supporting member;

said supporting member supporting a planetary gear which is attached to said second rotatable shaft to rotate therewith and which has a first and second gear parts having different numbers of teeth, in such a way as to allow said planetary gear to rotate about an axis in parallel with said second rotatable shaft;

(b) said second element of said planetary gear mechanism is formed of a first sun gear which engages with said first gear part of said planetary gear; and (c) said third element of said planetary gear mechanism is formed of a second sun gear which engages with said second gear part of said planetary gear.

7. An infinitely variable speed transmission according to claim 3, wherein:

(a) said first element of said planetary gear mechanism is formed of a supporting member;

said supporting member supporting a planetary gear which is attached to said second rotatable shaft to rotate therewith and which has a first and second gear parts having different numbers of teeth, in such a way as to allow said planetary gear to rotate about an axis in parallel with said second rotatable shaft;

(b) said second element of said planetary gear mechanism is formed of a first sun gear which engages with said first gear part of said planetary gear; and (c) said third element of said planetary gear mechanism is formed of a second sun gear which engages with said second gear part of said planetary gear.

8. An infinitely variable speed transmission according to claim 1 wherein said first rotatable shaft is an input shaft and wherein said second rotatable shaft is an output shaft.

9. An infinitely variable speed transmission according to claim 2 wherein said first rotatable shaft is an input shaft and wherein said second rotatable shaft is an output shaft.

* * * * *